J. H. CLUNE.
TIRE CONSTRUCTION.
APPLICATION FILED JAN. 15, 1913.
1,098,017.
Patented May 26, 1914.
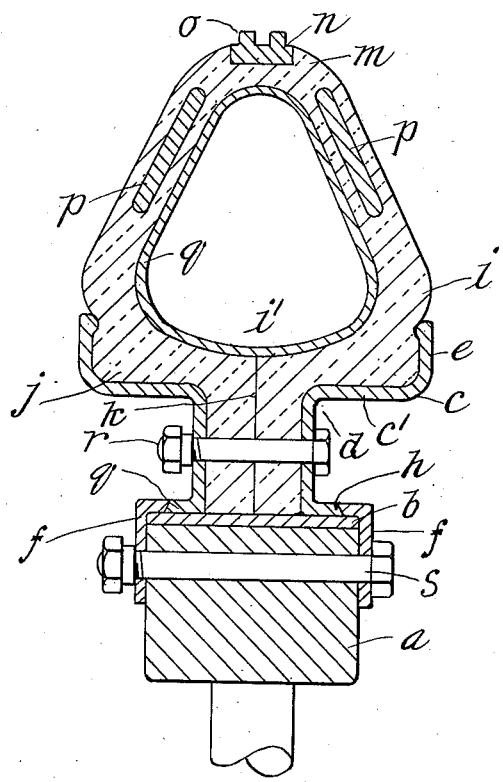
WITNESSES:
INVENTOR,
John H. Clune,
BY
Chapin & Co.
ATTORNEY.

UNITED STATES PATENT OFFICE.

JOHN H. CLUNE, OF SPRINGFIELD, MASSACHUSETTS.

TIRE CONSTRUCTION.

1,098,017. Specification of Letters Patent. Patented May 26, 1914.

Application filed January 15, 1913. Serial No. 742,102.

*To all whom it may concern:*

Be it known that I, JOHN H. CLUNE, a citizen of the United States of America, residing at Springfield, in the county of Hampden and State of Massachusetts, have invented new and useful Improvements in Tire Construction, of which the following is a specification.

This invention relates to improvements in tires and the fastenings therefor.

An object of the invention is to produce a tire having a narrow tread-portion so that the vehicle to which it is attached will be more easily propelled over the roadway.

A further object of the invention is to so construct the tire that it will not be readily punctured or blow-outs produced therein.

Broadly, the invention consists in the insertion of strips of vulcanized rubber within the body portion of the tire and on the opposite sides thereof.

A further object of the invention is to provide a broad bearing or resting surface for the base portion of the tire, thus affording a rigid support for attaching the tire to its clamping rings and for receiving the load placed thereon.

Referring to the figure of the drawing, which forms a part of the specification: It shows a transverse sectional view of the completed tire and the attaching means therefor, and also clearly illustrates the solid rubber tread-portion, the insert-pieces composed of some substance harder than the body of the tire, and the clamping-rings for securing the tire to the rim of the wheel.

Referring to the drawing,—$a$ designates the felly portion of the wheel and $b$ the rim portion, which usually consists of a band of steel shrunk on to the felly that is usually composed of wood. The clamping-rings for supporting and securing the tire in place on the wheel are indicated at $c$. These rings are substantially channel-shape in cross-section, as indicated at $d$, and are formed with an outwardly-projecting annular or flange portion $e$ against which the lower, outer sides of the tire rests when it is clamped in place. The distance $c'$ from the portion $e$ to the channel part $d$ is made comparatively long to afford a broad bearing or base portion for the tire to rest on and support the load. The lower or base portion of the clamping-rings $c$ is secured to the felly $a$ by means of the angular-shaped ring-pieces $f$ which extend down onto the sides of the felly and up onto the rim $b$. These ring-pieces engage the lower portions $g$ of the clamping rings $c$ in any suitable manner for the purpose of securing them to the felly, and as indicated, supplemental inclined surfaces $h$ are employed for securing the clamping-rings $c$ to the felly.

Referring to the tire construction, the body portion of which is indicated at $i$ and the base portion at $j$,—this tire is separable on the line $k$. It will be noticed that the base portion of the tire which lies between the edges $e$ and that engages the clamping-rings $c$, is made very wide or broad to afford a broad support for the tire. The tread-portion of the tire is made comparatively narrow, as indicated at $m$, and is provided with an insert-piece $n$ of solid rubber, and formed thereon are the projections $o$ to prevent the skidding or slipping of the vehicle. The shape of the tire in transverse section is substantially pear-shaped. Located within the body of the tire and at the sides thereof are insert-strips $p$ of vulcanized rubber, or some other hard substance that resists puncture and can be readily vulcanized with the body part of the tire. These puncture-proof strips are inserted during the building up process of the tire.

When the whole tire is vulcanized, the strips, together with the strips of solid rubner $n$, are securely connected in the finished article. The tread-strip $n$ is also inserted during the building up process and is securely held in place, as stated, after the vulcanization of the whole body of the tire. The usual inner tube is indicated at $q$.

From this construction of the tire, it will be seen that a large air-space is formed within the tube at its lower or base portion, thus rendering the tire capable of receiving shocks or jars on the roadway, and, as the largest volume of air is located near the base portion of the tire, as indicated by the space $i'$, this part of the tire will receive the shocks more than the narrow tread-portion, which is an important feature of the present invention. The usual fastening bolts for the rings $c$ are indicated at $r$ and the usual securing bolts for the holding rings $f$ are indicated at $s$. From this construction it will be seen that a tire is produced that is simple to make and one that will readily resist puncture and at the same time permit the vehicle to move easily over the roadway.

The puncture-resisting strips $p$ serve also to strengthen this part of the tire when carrying the load, and assist in permanently maintaining its shape.

It is to be particularly noted, that, inasmuch, as the broad flat base portion lying within the clamping rings $c$, is substantially the portion of greatest width and as the tread is very narrow in comparison with the width of this base portion, the stresses set up in the tread portion will be transmitted practically normal to the base of the tire. To insure this action, the insert strips $p$ are located within the inclined side portions of the tire to reinforce the same. These strips prevent the bulging of the sides, resist any transverse stresses and tend to preserve the cross-sectional shape of the tire shown when the same is under load. Moreover, blow-outs usually occur in the side portions of a tire and more particularly in that portion immediately below and adjacent the tread portion. The strips $p$ are located, as shown, in the very position of the tire in which these blow-outs are wont to occur and thus serve to resist and prevent the same.

What I claim is,—

A pneumatic tire, substantially pear-shaped in cross-section, comprising a broad flat base portion, means to attach the same to the wheel, a rounded tread portion, very narrow in comparison to said base portion, side portions connecting said tread and said base portions and inclined relative thereto, and puncture resisting reinforcing strips of hard rubber located within and adherent to the upper sections of said inclined side portions, said strips being designed to resist the outward or transverse stresses on the tire when in use.

JOHN H. CLUNE.

Witnesses:
K. I. CLEMONS,
HARRY W. BOWEN.